W. T. DUVALL.
Piston for Steam-Engines.

No. 166,592. Patented Aug. 10, 1875.

WITNESSES:
Sydney E. Smith
H. A. Daniels

INVENTOR:
Wm. T. Duvall
by Attorney
W. Morris Smith

2 Sheets--Sheet 2.

W. T. DUVALL.
Piston for Steam-Engines.

No. 166,592. Patented Aug. 10, 1875.

WITNESSES:
Sydney E. Smith
H. A. Daniels

INVENTOR:
Wm. T. Duvall
by Attorney
W. Morris Smith

UNITED STATES PATENT OFFICE.

WILLIAM T. DUVALL, OF GEORGETOWN, DISTRICT OF COLUMBIA, ASSIGNOR TO HIMSELF AND JOSEPH L. SIMMS, OF SAME PLACE.

IMPROVEMENT IN PISTONS FOR STEAM-ENGINES.

Specification forming part of Letters Patent No. 166,592, dated August 10, 1875; application filed August 4, 1875.

*To all whom it may concern:*

Be it known that I, WM. T. DUVALL, of Georgetown, in the county of Washington and District of Columbia, have invented an Improved Piston for Steam-Engines, of which the following is a specification:

The construction of this piston is intended to supply what may be termed a solid metallic piston, as contradistinguished from those having spring-borne packing-rings, but, while virtually solid, is capable of being expanded, to compensate for wear consequent on use, which wear is much less in a solid piston than in one that is self-expanding, as such last named will continually cut upon every soft portion of its own periphery, or of the inner periphery of the cylinder within which it reciprocates; and it consists in novel details of construction, which will be hereinafter described with reference to the drawings, in which—

Figure 1:
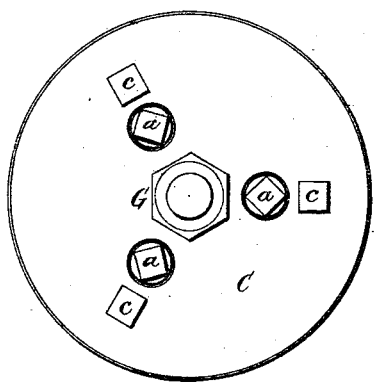
Figure 2:
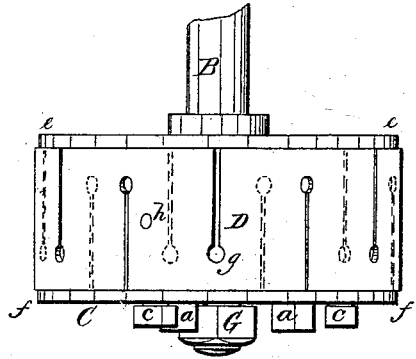
Figure 3:
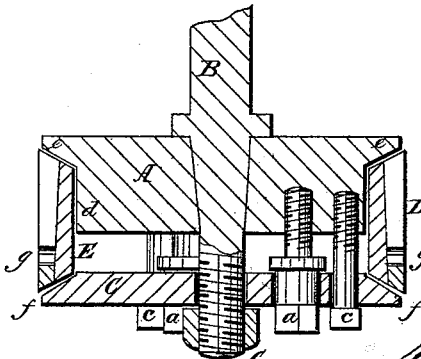
Figure 4:
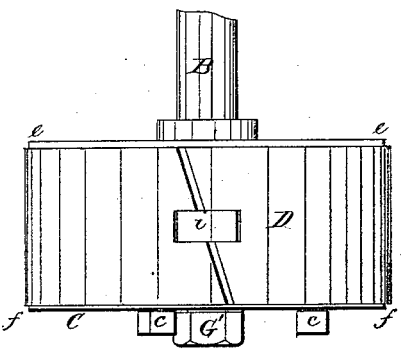
Figure 5:
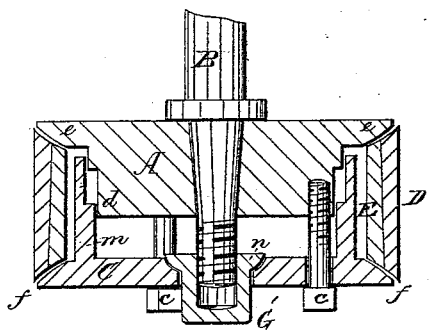
Figure 6:
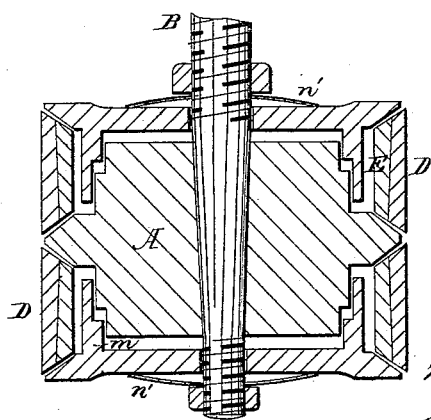

Figure 1 represents an end view of the piston. Fig. 2 is a side elevation of the same. Fig. 3 is a transverse section taken on the line $x$ $x$ of Fig. 1. Fig. 4 represents a side elevation of a piston embracing the same principle, but simplified to suit small engines. Fig. 5 is a transverse section of the same on the plane of its axis. Fig. 6 is a similar section of a piston more particularly adapted for very large engines.

The same letters occurring on the several figures indicate like parts.

A constitutes the body of the piston, which is connected with the piston-rod B in any suitable manner. It consists of a lower cylindrical portion, $d$, and an upper flange portion, $e$, the latter in its cross-section being spherical or conical on its under side. The piston-head or follower C is of corresponding form to that of the flange portion of the body A, but with its spherical or conical face $f$ inverted; and between these two spherical or conical flanges are two metallic rings, D and E, one within the other. The inner is preferably made slightly tapering on its outer periphery, while the outer one is of corresponding taper on its inner periphery. Thus formed they are ground together to fit accurately the one within the other, so as to be steam-tight, after which the annular faces of the two together are turned off concave, spherically, or conically, as may be, so as to fit against the corresponding flanges of the piston-body A and head or follower C, above described, by which the said rings are held in position concentrically with the body A. The inclines of these flanges $e$ and $f$, however, should be slightly greater than those of the annular surfaces of the rings D and E, so as to bite first or tightest on the inner ring E, the effect of which is to expand the inner ring E, and through it the outer ring D, to adjust the latter steam-tight within the cylinder, which is done by the screw-nut G or screws $c$, that retain the follower in the manner hereinafter described. It is not absolutely necessary that these rings should be fitted together tapering, as above described, as, if cylindrical, the pressure of the flanges, being on the edges of the inner rings, will insure them being in close contact.

In Fig. 2 the rings D and E are represented as slotted from either edge alternately all around, each slot terminating in a drilled hole, $g$, at from two-thirds to three-fourths the width of the ring. These slots and holes in the outer ring D are represented in full lines, and those in the inner ring E in dotted lines, which, when the rings are together, range intermediately of each other, and the two rings are held together in such position by a steady-pin passing through both, as at $h$, Fig. 2.

The slots above referred to may be parallel with the axis of the piston; but I should prefer to make them diagonal thereto, to avoid the possibility of forming ribs in the cylinder.

On Sheet 2 of the drawing is represented a modification of the same invention, which is less expensive to construct, and is suitable for small engines, in Figs. 4 and 5 of which the piston-block and follower, with their respective flanges, are substantially the same; but the rings D and E, instead of being slotted all around, partly through, as shown in Fig. 2, have each one diagonal cut through them, to admit of their expansion by the conical flange borne against them, the outer one having a block, $i$, fitted across the slit in the ring to prevent the passage of steam.

The piston represented in Figs. 4 and 5 is adapted for use in small engines, and is to be adjusted to fit the cylinder by screwing down the follower C by means of their bolts $c$, and when the rings D E are sufficiently expanded the nut G' on the lower end of the piston-rod B is to be screwed outward until its valve-shaped flange $n$ takes a bearing on the inner side of the follower, thus preventing the latter from yielding at the center under the pressure of steam, and making a steam-tight joint around the rod.

For larger-sized pistons the construction represented on Sheet 1, and Fig. 6 on Sheet 2, would be best adapted, in adjusting which, to expand the rings, the block-screws $a$ are first to be set inward slightly, after which the follower C may be screwed down by turning the set-screws $c$ until the desired expansion is obtained, after which the block-screws $a$ are to be set back until their collars take bearing against the inner side of the follower, and the nut G on the end of the piston-rod may be then screwed up, thus bracing and supporting the follower on both sides against flexure by the pressure of steam on it, and from undue expansion of the rings from the same cause.

For extremely large pistons the duplication of the hub, with a follower both above and below, as represented in Fig. 6, and set and supported by screws $c$, $a$, and G in numbers proportionate to its diameter, as shown in Fig. 3, might be desirable.

The piston-block A may also be constructed to receive a follower having an annular flange, $m$, to encircle the cylindrical portion of said block, as represented in Figs. 5 and 6, which will tend in great measure, in combination with said block A and the slotted rings D and E, to prevent them from cross-winding on each other when set up by the tightening-screws $c$.

It will be obvious that in very small pistons the tightening-screws $c$ may be dispensed with and the follower constructed with a central boss threaded internally to screw onto the end of the piston-rod, by turning which the cones on the follower and flange of the piston-block will cause the rings to expand, as before described.

This mode of expanding the packing-rings of a piston, particularly when of large diameter, admits of its adjustment without removing the heavy cover or base of the cylinder, as the tightening and block screws may all be made accessible through key-holes or plugged apertures provided in the former.

What I claim, and desire to secure by Letters Patent, is—

1. The construction of the rings D E, slotted alternately from either edge, as and for the purpose described.

2. The follower C, constructed with a cylindrical collar, $m$, to encircle the hub A of the piston, in combination with said hub and with the slotted rings D and E, for the purpose set forth.

W. T. DUVALL.

Witnesses:
 SYDNEY E. SMITH,
 WM. MORRIS SMITH.